United States Patent Office 3,399,068
Patented Aug. 27, 1968

3,399,068
ATTAPULGITE PRODUCT AND METHOD OF PREPARING SAME
Norman H. Horton, Tallahassee, Fla., assignor, by mesne assignments, to Engelhard Minerals & Chemicals Corporation, Menlo Park, N.J., a corporation of Delaware
No Drawing. Filed Mar. 18, 1966, Ser. No. 535,337
9 Claims. (Cl. 106—72)

ABSTRACT OF THE DISCLOSURE

A degritted clay product especially adapted for use in thickening aqueous liquids is prepared by dispersing crude attapulgite clay in water in the presence of a sodium condensed phosphate dispersant, such as tetrasodium pyrophosphate, degritting and centrifuging the dispersion, adding a water-soluble alkaline earth metal or heavy metal salt to the dispersion in amount of 1 equivalent per equivalent of alkali metal in the dispersant, thereby precipitating the dispersant. The mixture is dried under mild conditions and ground.

This invention relates to colloidal attapulgite clay and its use as an agent to gel liquids. The invention is especially directed to an improved gel-forming grade of attapulgite clay characterized by having a very low grit content.

Attapulgite clay is a unique magnesium aluminosilicate clay. Colloidal grades of attapulgite clay have a volatile matter (defined hereinafter) in excess of 10 percent and contain sufficient water of hydration and physically held water to disperse in water into colloidally dimensioned particles with the resulting formation of a viscous system. The colloidal grades of this type of clay are widely used in gelling aqueous and nonaqueous liquids. To prepare attapulgite clay thickened systems, a finely divided form of the clay is agitated in the liquid to be thickened. The liquid thickens as a result of a unique orientation of the needlelike (acicular) attapulgite clay crystals in the dispersion medium. This is quite different from the mechanism by which bentonite clays thicken liquids. The latter clays are platelike, rather than acicular, and they thicken liquids when the liquid penetrates and spreads the layers of the platey mineral particles.

Attapulgite clay, as mined, contains relatively coarse grit, predominantly silica, in addition to colloidal clay minerals. For some uses of colloidal attapulgite clay the presence of this grit is not detrimental. For example, attapulgite clay employed as a thickening agent for muds used in the rotary drilling of oil wells can contain substantial grit. In fact, attapulgite clay has greater viscosity building properties when the native grit is present. Therefore, in preparing attapulgite clay thickening agents for use in the rotary drilling of oil wells, it suffices to crush the raw clay, mildly dry and then pulverize. Preferably, the raw clay is mixed with a small amount of water in a pug mill and is extruded before the mild drying and pulverization. This is done to enhance the gel-forming properties of the clay since extrusion under pressure has a very beneficial effect on the gel-forming properties of the clay.

For some applications of thickening agents, it is essential or desirable to employ a thickening agent which has a very low grit content and is, therefore, substantially nonabrasive. As an example, clay or other colloids that are used to thicken aqueous (latex) paint systems or pharmaceutical preparations must be low in grit. Typically, the clay should have a Valley abrasion index (defined hereinafter) below 75, preferably below about 40. Low grit colloidal attapulgite clay products are produced commercially by subjecting raw clay to partial sand elimination and then subjecting the clay to a grinding action or micronization sufficiently intense to reduce the unrejected grit to an acceptable fine particle size. The grinding required by the operation has the effect, however, of undesirably reducing the thickening properties of colloidal attapulgite clay. Therefore, attapulgite clay which has been ground in a fluid energy mill to prepare a low grit colloidal product does not have the remarkable viscosity building properties that were characteristic of the clay before the grinding operation.

It is also possible to degrit attapulgite clay from an aqueous dispersion by wet-degritting since the grit has a larger particle size and/or higher apparent density than the dispersed clay crystals. The grit therefore gravitates more rapidly than the clay when the clay and grit are suspended in water. To degrit the clay hydraulically in an economically feasible manner, it is essential to disperse the clay in water with the aid of a dispersing (deflocculating) agent and separate out the sediment or grit by static or dynamic sedimentation. Alkali metal silicates or alkali metal condensed phosphate salts can be used to disperse the clay. Preferably, an alkali such as sodium hydroxide is employed with the primary dispersant. The degritted clay is recovered in the form of an aqueous dispersion which can be dried and pulverized. Attapulgite clay which has been degritted hydraulically by this method has poor thickening properties at normal levels of use (3 percent to 10 percent based on the weight of the liquid to be thickened). In fact, the clay has poorer gel-forming properties than dry-degritted, fluid energy ground attapulgite clay. Prior to this invention, it was not possible to obtain economically a wet-processed degritted colloidal attapulgite clay thickening agent having gel-forming properties comparable to that of gritty colloidal attapulgite clay, exemplified by commercial grades of attapulgite drilling mud clay. In fact, it was not possible to prepare a wet-processed degritted colloidal attapulgite thickening agent comparable to dry-processed (micronized) colloidal attapulgite clay.

According, an object of this invention is to produce a superior gelling grade of attapulgite clay having very low grit content.

A specific object of this invention is the provision of a method for treating defloculated degritted aqueous attapulgite clay dispersions whereby the treated clay will exhibit good gel-forming properties when dried.

Another object is to provide low-grit, purified colloidal attapulgite products having gel-forming properties comparable to that of commercial gritty colloidal attapulgite products.

Further objects and features of this invention will be apparent from the description thereof which follows:

I have discovered a simple and economical method for processing degritted dispersed aqueous attapulgite clay suspensions whereby the clay, when dried, possesses outstanding gelling properties in aqueous liquids. In this manner, a low-grit content, finely divided colloidal attapulgite clay thickening agent is obtained without impairing the native thickening powers of the clay.

Stated briefly, in accordance with this invention, a low-grit superior gel-forming grade of attapulgite clay is prepared as follows. Colloidal raw attapulgite clay is dispersed in water at a high pH in the presence of an alkali metal salt of a condensed phosphate clay dispersant which would normally adversely affect the gel-forming properties of the clay. The dispersed fluid slurry is degritted and then flocculated and thickened by the addition of a soluble source of polyvalent metallic cations selected from the group consisting of alkaline earth metal salt and heavy metal salt. The addition of the polyvalent metal salt results in the precipitation of the alkali metal salt of the condensed phosphate by a metathetical reaction carried out in situ (in the presence of clay and water). The thickened mixture of flocculated clay and precipitated condensed phosphate salt is dried under mild conditions, with the usual precautions being taken to avoid removal of too much water which would impair the colloidal properties of the clay. The dried clay is then pulverized.

In accordance with a preferred form of this invention, the flocculated thickened slurry of degritted clay is further thickened by addition of a small amount of pulverulent colloidal attapulgite clay (preferably previously degritted clay) using sufficient of the additional clay to place the thickened clay in a better form for handling with conventional clay handling equipment, such as extruders. The mixture is subsequently dried mildly and pulverized.

The improved clay thickening agent of the present invention is a finely divided solid comprising particles of colloidal attapulgite clay substantially free from grit and coated with a poorly soluble component comprising an alkaline earth or heavy metal salt of condensed phosphate and a water-soluble component, namely the by-product of metathesis, such a sodium sulfate. The soluble component can be removed from the clay by washing, if desired.

In the case that a secondary dispersant (alkali metal silicate and/or alkali hydroxide) is employed with the condensed phosphate, it is preferable to employ the source of polyvalent metallic ions in amount sufficient to react with the secondary dispersant as well as the primary condensed phosphate dispersant. In this case, the clay product will contain the alkaline earth or heavy metal precipitated form of such material.

Products of this invention are especially useful in thickening aqueous liquids and compare favorably in effectiveness with colloidal clay that has not been degritted. Salt solutions, e.g., concentrated aqueous solutions of sodium chloride, are effectively thickened by the clay product of this invention. The product is also useful in gelling organic liquids, including nonpolar organic liquids. When employed to thicken organic liquids, a surface active agent, such as heptadecenylimidazoline, should be used to promote the dispersion of the clay in the organic liquid, as is well known to those skilled in the art.

An essential feature of the invention resides in the use of an alakali metal salt of a condensed phosphate as the clay dispersant. The desired results are not obtained when other clay disperants, such as alkali metal hydroxide, alkali metal silicates or mixtures of alkali metal hydroxide and alkali metal silicate are employed in the absence of the alkali metal condensed phosphate. Although alkali metal silicates are eminently effective as dispersants for colloidal attapulgite clay, especially when used in combination with sodium hydroxide, when alkali metal silicates alone or in combination with alkali metal hydroxide are used to disperse the clay, addition of the polyvalent metallic cations does not result in products having thickening properties in aqueous liquids comparable to that of products obtained using condsensed phosphate dispersants. Thus, when colloidal attapulgite clay is dispersed with alkali silicate and caustic, degritted, flocculated by addition of a source of suitable metal ions, such as magnesium sulfate, and then mildly dried, the resulting clay product has poor thickening properties in aqueous media as compared to clay which has been processed in a similar manner with a condensed phosphate as the dispersant. However, it is fully within the scope to employ caustic and/or alkali metal silicate together with the condensed phosphate dispersant.

Another essential feature of the invention resides in the use of alkaline earth metal or heavy metal cations as the flocculating agent. Other clay flocculating agents such as mineral acids or polyvalent metal cations outside the scope of the invention, such as aluminum ions, do not result in the production of degritted attapulgite clay products having gel-forming properties in aqueous liquids comparable to that of products of the invention.

In putting the invention into practice, the crude, gritty raw attapulgite clay is dispersed in water containing an alkali metal condensed phosphate salt as a primary clay dispersant. This class of dispersants includes sodium hexametaphosphate, sodium acid pyrophosphate (SAPP), tetrasodium pyrophosphate (TSPP), sodium tripolyphosphate, sodium tetraphosphate, etc., and analogous potassium compounds. The alkali metal condensed phosphate dispersants are used in amount within the range of ½ percent to 5 percent of the clay weight (volatile-free clay weight basis). Usually they are employed in amount within the range of 1 percent to 3 percent of the volatile-free clay weight. Volatile-free (V.F.) clay weight is determined by heating clay to essentially constant weight at 1800° F. In the case of raw attapulgite clay, volatile matter is primarily water, although a small amount of oxides of carbon usually accounts for some of the volatile matter. As mentioned, the aforementioned clay dispersants can be used in conjunction with sodium hydroxide, which is added in amount to bring the pH of the dispersed clay system to a value within the range of about 10.0 to 12.5. This amount of alkali is usually within the range of ½ percent to 1 percent of the V.F. clay weight. The sodium hydroxide permits the clay to be dispersed at remarkably high solids content when dispersion is carried out at elevated temperature (180° F. to 220° F.).

Water-soluble alkali metal silicates can be used as secondary dispersants. This class of dispersants encompasses sodium silicates having a percent $Na_2O$:percent $SiO_2$ (weight basis) of 1:1.60 to 1:3.75. Of the alkali metal silicates, the highly alkaline silicates having percent $Na_2O$:percent $SiO_2$ within the range of 1:1.60 to 1:3.22 are preferred since they are especially effective in dispersing attapulgite clay. Soluble potassium silicates, e.g., those having $K_2O$:percent $SiO_2$ of 1:2.20 to 1:2.50 can be used.

The raw attapulgite clay employed as a starting material is colloidal form of the clay, i.e., the clay has never been dried to a volatile matter (V.M.) below about 18 percent and, therefore, possesses the natural colloidal characteristics of the clay as mined. The raw clay as mined usually contains from 5 percent to 15 percent by weight of free silica (principally as quartz) and from 1 percent to 6 percent calcium carbonate. The Valley abrasion of the raw clay is very high, typically in excess of 300. The nonclay minerals (quartz, calcite, feldspar, mica and dolomite) found in the crudes are predominately in the plus ½ micron size and are intimately mixed with clay particles. The clay particles can be dispersed to a major weight percent of particles finer than 1–2 microns.

The raw clay is dispersed in an aqueous solution of the dispersant at 15 percent to 30 percent clay solids, usually 20 percent to 22 percent solids, by agitating the clay in the solution. Clay solids are calculated on a V.F. clay weight basis. At clay solids content in excess of 30 percent the slips are too viscous to be degritted hydraulically. For economic reasons, the clay slip should have as high a clay solids content as is possible. The dispersed slips or dispersions are distinctly fluids when formulated with a suitable dispersant system for the particular clay crude that is employed. With some clay crudes, fluid dispersions as concentrated as 25 percent to 30 percent solids can be prepared by careful selection of the dispersants and dispersion conditions.

To degrit the slip, coarse grit can be removed initially by screening the slip over screens, e.g., 60 or 150 mesh (Tyler) screens. In a typical operation, the coarse fractions from the screens may amount to 5 percent to 10 percent of the feed (V.F. weight basis) and contain large quantities of free silica and quartz. The screened slips can then be centrifuged to eliminate plus 2 micron particles from the slip. Centrifugal bowl classifiers operated at high pond depths and high speed are useful. The underflow fractions of the centrifugal classifiers may contain substantial amounts of undispersed clay. In this case, the underflow, which is typically at 40 percent to 60 percent solids, can be redispersed and recentrifuged.

The overflow from the centrifuge is the degritted slip of deflocculated clay and may contain from 1 percent to 2 percent free silica (V.F. basis) and represent a 60 percent to 90 percent recovery of the clay. The clay has a low Valley abrasion, typically within the range of about 10–40. The clay slip is distinctly fluid and watery in consistency. The degritted clay slip is somewhat lower in solids than the dispersion before degritting, due to the removal of grit solids. For example, a deflocculated attapulgite clay dispersion containing 20 percent clay solids when prepared may contain only 18 percent clay solids after screening and hydroclassification.

As mentioned, the polyvalent metallic cations employed to flocculate the clay slurry include alkaline earth metal cations and heavy metal cations. Mixtures of cations can be employed. Alkaline earth metals include magnesium, calcium and strontium. Polyvalent heavy metal cations include lead, tin, zinc, cadmium, mercury, manganese, chromium, iron, cobalt, nickel and copper. (Reference is made to Chapters 21 and 22 of Selwood's "General Chemistry," Holt, Reinhart and Winston, Inc. (1959).

The source of metallic cations is preferably added to the dispersed degritted slip without drying the slip to a solid state or condition before addition of the cations. In other words, it is preferable to add the polyvalent metal salt to a fluid dispersed slip which has not been dried rather than dry the slip, reslurry the clay and add the source of metallic cations. Slips which have been treated with the metallic salt without preliminary drying result in products which are significantly more effective as thickening agents than products obtained with predried dispersed slips which are reslurried and treated with polyvalent metal salt.

The source of the metallic ions must be a material having sufficient solubility in the dispersed clay slip at the pH of the slip to supply sufficient cations to precipitate the condensed phosphate. Generally speaking, metallic salts of strong acids are the preferred source of the metallic cations because of their solubility.

The preferred metallic cations employed to precipitate the condensed phosphate are magnesium ions. These ions are conveniently incorporated in the form of magnesium sulfate, which is a soluble, inexpensive source of magnesium ions that does not introduce anions that are objectionable for most purposes. With heavier elements, such as calcium, strontium and several of the heavy metals, sulfates are too low in solubility for effective use and nitrates, chlorides, acetates, oxychlorides or other soluble salts are recommended. It is also within the scope of the invention to provide metallic ions in situ by adding a poorly soluble compound of a suitable metal, such as the oxide or hydroxide, and solubilize the compound in situ by addition of a suitable reagent, such as an acid, in the case of an oxide or hydroxide.

The preferred quantity of the source of metallic ions added to thicken the degritted dispersed slurry is the amount calculated to precipitate all of the condensed phosphate dispersant and react with essentially all of the alkali metal hydroxide and/or alkali metal silicate. For example, the preferred quantity of magnesium sulfate ($MgSO_4 \cdot 7H_2O$) employed with a dispersion containing 100 pounds tetrasodium pyrophosphate ($Na_4P_2O_7$) as the sole clay dispersant would be about 186 pounds, corresponding to one equivalent Mg per equivalent Na. In practice, it is impractical to determine with great accuracy the dispersant content of the slip after degritting since the composition of the degritted slip will vary with the specific crude being treated. The stoichiometric quantity of additive can be approximated by adding the magnesium sulfate or other source of metallic cations until the pH of the slip drops to the natural pH of the clay— which is typically about 7.8 to 9.0. At this point, the slip is distinctly flocculated. With most systems, the amount of magnesium sulfate added will fall within the range of about 1.0 to 2.0 pounds of $MgSO_4 \cdot 7H_2O$ per 100 pounds of clay crude or about 2.0 to 4.0 pounds of $MgSO_4 \cdot 7H_2O$ per 100 pounds of V.F. clay. When too much magnesium sulfate is added, the viscosity of an aqueous dispersion of the resulting clay product will be appreciably lower than that of the product made with magnesium sulfate addition to supply magnesium ions equivalent to the sodium ions in the dispersant.

In accordance with one form of the invention, the flocculated clay slip, which typically has a V.M. within the range of 75 percent to 80 percent, is placed in a pug mill. While the pugger is in operation, colloidal attapulgite clay which has previously been degritted hydraulically, is added to bring the V.M. of the flocculated slip to an extrudable consistency, typically to a V.M. within the range of about 58 percent to 60 percent. In a typical operation, about 600 to 700 pounds of clay (V.F. basis) is added per ton of degritted slurry. The charge is extruded into strands, typically about ⅜″ diameter, which are cut in pellets, typically about ⅜″ long. The pellets are dried at a product temperature below 300° F. to a V.M. within the range of about 18 percent to about 35 percent, preferably about 25 percent to 30 percent. The pellets are then crushed to the desired mesh size, usually 100 percent minus 40 mesh (Tyler). For some applications it may be desirable to grind to a finer mesh size, e.g., substantially all minus 100 mesh and 50 percent minus 325 mesh or even 100 percent minus 325 mesh.

Alternatively, the flocculated slurry can be mildly dried to a pulverulent state or condition without being extruded.

The following examples are given to contribute to a better understanding of the invention and illustrate certain advantages and features thereof.

Example I

This example illustrates the use of various soluble mineral acid salts of alkaline earth metals and heavy metals in the process of the invention and shows the superiority of these salts over metallic salts outside the scope of the invention.

A degritted slip of colloidal attapulgite clay was prepared by dispersing La Camelia crude clay from a mine near Aattapulgus, Ga., with tetrasodium pyrophosphate. The slip contained 1600 grams crude containing 41.7 percent free moisture, 14 grams tetrasodium pyrophosphate and 1950 milliliters of tap water. (Free moisture or F.M. is determined by heating a material to essentially constant weight at 220° F.) Dispersion was carried out by agitating the ingredients in a high shear mixer. Grit was removed by centrifuging the dispersion at 2500 r.p.m. for ten minutes. The resulting degritted slip contained 23 percent by weight solids and weighed 3008 grams.

Portions of the slip, each containing 200 grams, were treated with aqueous solutions or suspensions of various salts. All of the salts used were capable of flocculating the dispersed clay slip. In each case, the quantity of salt was calculated to provide 1 equivalent of salt per equivalent of tetrasodium pyrophosphate. In making the calculations, the assumption was made that all of the tetrasodium pyrophosphate used in preparing the dispersion was present in the degritted slip. On this basis, the number of equivalent weights of tetrasodium pyrophosphate per 200 grams of degritted slip was 0.014.

In treating the degritted clay slips, the salt was dissolved in 25 to 40 ml. of water and the solution added to the 200 gram portion of slip while mixing with a spatula. This flocculated the slips, which were then worked with the spatula until homogeneous pastes resulted. The pasty gels were dried at a product temperature below 300° F., ground in a laboratory Raymond mill and left in open containers to equilibrate to an equilibrium moisture content. All clay products had a F.M. of 11±0.6 percent.

The resulting powdered degritted clays were tested for colloidal properties by agitating fourteen grams of the clay product in 350 milliliters of water for 25 minutes with a Sterling "Multimixer." Fann viscosities were determined at a shear rate of 600 r.pm. The results, summarized in Table I, show that soluble alkaline earth and heavy metal salts were vastly superior to other salts, including polyvalent salts, in producing gel-forming degritted attapulgite clay. Thus, products of this invention resulted in aqueous systems having viscosities within the range of 18.5 to 24.7 cps. The calcium sulfate, which had very low solubility, was comparatively ineffective and resulted in a liquid having a viscosity of only 14.5 cps. Aluminum sulfate and ammonium sulfate, while soluble, did not enhance the gel-forming properties of the clay as did the soluble salts of alkaline earth and heavy metals and resulted in liquids having viscosities of 13.0 cps. and 6.0 cps., respectively.

Example II

In accordance with this invention, a superior gelling, low grit attapulgite clay product was prepared as follows.

Raw attapulgite clay from a mine near Attapulgus, Georgia was the starting material. A representative sample of the clay contains about 11 percent by weight free silica and 5 percent CaCO₃ (based on the V.F. clay weight).

The clay crude was mixed with water, extruded into pellets, dried at a product temperature beow 300° F. to a V.M. of about 25 percent and crushed to minus 100 mesh. The extruded clay was dispersed in water at 25 percent solids with tetrasodium pyrophosphate as the sole clay dispersant. The tetrasodium pyrophosphate was employed in amount of 2.5 percent of the clay weight, on a V.F. clay weight basis. The dispersion was carried out by dissolving the tetrasodium pyrophosphate in water and agitating the extruded clay in the water for about thirty minutes of about 150 F. The resulting fluid slip was permitted to cool to room temperature, screened over a screen dressed with 70 and 200 mesh screens. The overflow was discarded and the underflow was gritted in centrifugal bowl classifiers with a 2.5 micron cut off.

The degritted aqueous slip of minus 2.5 micron clay, at somewhat less than 25 percent clay solids, was placed in a pug mill and MgSO₄.7H₂O was added in amount of 10.9 pounds per 100 pounds clay (as is clay weight basis) in the slip. It was calculated that each 1000 parts by weight of the slip contained 250 parts by weight V.F. clay, 6.25 parts by weight Na₄P₂O₇ and 11.5 parts by weight

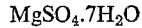

Therefore, for each mole of Na₄P₂O₇, two moles of

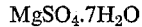

had been added. In other words, there was about one equivalent Mg for each equivalent of Na.

The mixture was pugged for thirty minutes, during which time a small amount of raw attapulgite clay was added, sufficient to form a mix having a V.M. of 50 percent. At the end of the pugging mixture had formed a stiff slurry having a pH of 7.5. The mixture of colloidal clay, magnesium condensed phosphate salt, sodium sulfate and water was extruded through a piston extruder and the product oven dried at 225° F. to a V.M. of 18.0 percent. The dried product was crushed in a jaw crusher and pulverized by a single pass through a Raymond hammer mill.

The product was evaluated for viscosity in distilled water at a load of 25 lbs./bbl. with a Sterling "Multimixer" for 25 minutes. The measurement of clay concentration in terms of pounds per barrel is conventional in the drilling mud field and is described in API RP 29, Standard Field Procedure for Testing Drilling Fluid, Fourth Edition. The Fann viscosity of the resulting gels was measured and compared to that of gels obtained from other degritted attapulgite clay products. It was found that the product of the invention had a viscosity of 66.5 cps. when freshly prepared. Upon cooling to 75° F., the viscosity was 66.0 cps. This viscosity was comparable to the viscosity of a similar concentration of crude clay which was not degritted and was markedly superior to the 16.3 cps. (hot) and 16.0 cps. (75° F.) viscosity of similar colloidal attapulgite clay degritted by fluid energy grinding. In the absence of magnesium sulfate flocculating agent, a similarly dried, degritted dispersion of the attapulgite clay would have had a viscosity less than 5 cps. for a slurry of 25 lbs./bbl. clay concentration.

Example III

Experiments were carried out to compare the properties of attapulgite clay products in which dispersed degritted slips of the clay were flocculated with mineral acid with the properties of clay in which the dispersion was flocculated, in accordance with this invention, with magnesium sulfate. Experiments were also carried out to demonstrate the effect of the quantity of magnesium sulfate flocculant on the gel-forming properties of the resulting treated clay products.

The general procedure of Example II was repeated with a crude that had not been extruded. The crude was slipped at 25 percent solids with a mixture of tetrasodium pyrophosphate and sodium hydroxide dispersants, each employed in amount of 1.0 percent of the V.F. clay weight. The slip was degritted as in Example II and the degritted slip divided into several portions. Each portion was placed in a pug mill and magnesium sulfate was added and the mixture pugged. Various quantities of the salt were used in the several runs, the quantity being at least equivalent to the total quantity of dispersant employed (Na₄P₂O₇ plus NaOH). With one portion of the slip, 85 percent phosphoric acid was used as the flocculating agent instead of magnesium sulfate. In this case, the acid was employed in amount equivalent to the total dispersant employed. The pugged slips were dried at 225° F. to V.M. values within the range of 24 percent to 28 percent, crushed and hammer milled, as in Example II. The viscosities were evaluated as in Example II, with the results summarized in Table II.

The results show that the magnesium sulfate was markedly superior to mineral acid as a flocculating agent when each was used in amount equivalent to the dispersant. Thus, when the degritted clay dispersion was flocculated with an equivalent of magnesium sulfate, the dried product was markedly more effective in gelling water than the product obtained by flocculating the degritted dispersion with an equivalent of mineral acid. The results show also that the degritted attapulgite clay product was most effective in gelling water when the magnesium sulfate was used in amount equivalent to the dispersant.

A method for determining Valley abrasion is described in U.S. 3,014,836 to Proctor.

As used herein, mesh size refers to sieve sizes determined by screening on Tyler sieves. The term "minus" designates material that will pass through a sieve and, in like manner, the term "plus" designates material that will be retained on a particular size sieve. Micron sizes refer to values obtained by applying Stokes' law to specimens subjected to centrifugal sedimentation and assuming a viscosity value of 25 centipoises.

TABLE I.—EFFECT OF SALT ADDITION ON GEL-FORMING PROPERTIES OF COLLODIAL DEGRITTED ATTAPULGITE CLAY

| Salt Additive:[1] | Fann viscosity, cps. |
|---|---|
| Soluble salts of heavy metals and alkaline earth metals— | |
| $CuSO_4.5H_2O$ | 18.5 |
| $Pb(NO_3)_2$ | 21.0 |
| $ZnSO_4$ | 24.0 |
| $Ba(NO_3)_2$ | 24.7 |
| $MgSO_4.7H_2O$ | 21.0 |
| Salts outside scope of invention— | |
| $Al_2(SO_4)_3.18H_2O$ | 13.0 |
| $(NH_4)_2SO_4$ | 6.0 |
| $CaSO_4.\frac{1}{2}H_2O$ | 14.5 |

[1] All salts added in amount of 1.00 equivalent per equivalent of tetrasodium pyrophosphate.

TABLE II.—EFFECT OF FLOCCULATING AGENT ON THICKENING POWER OF DEGRITTED DISPERSED ATTAPULGITE CLAY

| Flocculating agent | Clay processing | | pH of flocculated clay | Thickening properties, viscosity in water, cp.[1] (25 lbs. clay/bbl.) | |
|---|---|---|---|---|---|
| | Amount of flocculating agent, g./1000 g. clay in slip (as is clay weight basis) | Equivalent flocculating agent/ equivalent total Na in dispersant | | Hot | 75° F. |
| $MgSO_4.7H_2O$ | 12.5 | 1 | 8.6 | 44.0 | 44.0 |
| $MgSO_4.7H_2O$ | 18.8 | 1½ | 8.6 | 38.5 | 40.0 |
| $MgSO_4.7H_2O$ | 25.0 | 2 | 8.5 | 37.0 | 38.0 |
| $H_3PO_4$ | 14.5 | 1 | 7.2 | 4.0 | 4.8 |

[1] Fann apparent viscosity.

I claim:
1. A method for preparing a gel-forming grade of attapulgite clay having a low grit content which comprises:
agitating raw attapulgite clay in water in the presence of a clay dispersing agent comprising from ½ percent to 5 percent, based on the volatile-free weight of said clay, of an alkali metal condensed phosphate, thereby forming a fluid aqueous dispersion,
degritting said dispersion, leaving a fluid aqueous dispersion of said clay containing said dispersing agent,
incorporating into said degritted fluid dispersion a polyvalent salt material selected from the group consisting of water-soluble alkaline earth metal salt and water-soluble heavy metal salt in amount substantially equivalent to alkali metal cations in said dispersing agent, whereby a polyvalent metal phosphate is precipitated,
and drying the clay thus treated without removing said precipitate.
2. The method of claim 1 wherein said polyvalent salt material is magnesium sulfate.
3. The method of claim 1 wherein said dispersing agent is a mixture of sodium hydroxide and sodium condensed phosphate.
4. The method of claim 1 wherein said dispersing agent consists of tetrasodium pyrophosphate which is employed in amount within the range of 1 percent to 3 percent of the volatile-free clay weight.
5. The method of claim 1 wherein said dispersing agent consists of tetrasodium pyrophosphate which is employed in amount within the range of 1 percent to 3 percent of the volatile-free clay weight and said polyvalent salt material is magnesium sulfate employed in amount to provide about 1 equivalent Mg per equivalent of Na in said tetrasodium pyrophosphate.
6. The method of claim 1 wherein said dispersing agent is a mixture of sodium condensed phosphate and sodium hydroxide, said sodium condensed phosphate being employed in amount within the range of 1 percent to 3 percent of the volatile-free clay weight and said sodium hydroxide being employed in amount within the range of ½ percent to 1 percent of the volatile-free clay weight, and said salt material is magnesium sulfate which is employed in amount to provide approximately 1 equivalent Mg to 1 equivalent Na in said sodium condensed phosphate and said sodium hydroxide.
7. The method of claim 1 wherein raw degritted attapulgite clay is added to said dispersed clay after said salt material is added, the quantity of said added raw degritted attapulgite clay being sufficient to form an extrudable mixture, and said mixture is extruded and then dried.
8. A low grit content, gel-forming grade of attapulgite clay having a Valley abrasion index below 40 and comprising particles of colloidal attapulgite clay admixed with a polyvalent metal condensed phosphate compound in which said polyvalent metal is selected from the group consisting of alkaline earth metal and heavy metal, said polyvalent metal condensed phosphate compound being present in proportion corresponding to that obtained by reacting 1 equivalent of water soluble salt of said polyvalent metal with 1 equivalent of alkali metal in an alkali metal condensed phosphate present in proportion of ½% to 5% of the volatile free weight of said clay,
said gel-forming grade of attapulgite clay being substantially free from alkali metal condensed phosphate.
9. A low grit content, gel-forming grade of attapulgite clay having a Valley abrasion index below 40 and consisting essentially of particles of colloidal attapulgite clay admixed with a polyvalent metal condensed phosphate compound in which said polyvalent metal is selected from the group consisting of alkaline earth metal and heavy metal, said polyvalent metal condensed phosphate compound being present in proportion corresponding to that obtained by reacting 1 equivalent of water soluble salt of said polyvalent metal with 1 equivalent of alkali metal in an alkali metal condensed phosphate present in proportion of ½% to 5% of the volatile free weight of said clay,
said gel-forming grade of attapulgite clay being substantially free from alkali metal condensed phosphate.

References Cited

UNITED STATES PATENTS 3,278,040   10/1966   Goldberg et al. _____ 23—110

JAMES E. POER, *Primary Examiner.*